United States Patent
Nikazm et al.

(10) Patent No.: US 11,194,354 B2
(45) Date of Patent: Dec. 7, 2021

(54) SYSTEM PRE-HEATER HAVING DATA STORAGE DRIVE FORM-FACTOR AND METHOD THEREFOR

(71) Applicant: DELL PRODUCTS, LP, Round Rock, TX (US)

(72) Inventors: Ayedin Nikazm, Austin, TX (US); James R. Utz, Austin, TX (US); Ed Ho Sung Chun, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 16/591,080

(22) Filed: Oct. 2, 2019

(65) Prior Publication Data

US 2021/0103305 A1    Apr. 8, 2021

(51) Int. Cl.
| | |
|---|---|
| *G05D 23/19* | (2006.01) |
| *G06F 13/42* | (2006.01) |
| *G05B 15/02* | (2006.01) |
| *G06F 1/26* | (2006.01) |
| *G06F 1/18* | (2006.01) |

(52) U.S. Cl.
CPC ............ *G05D 23/19* (2013.01); *G05B 15/02* (2013.01); *G06F 1/181* (2013.01); *G06F 1/187* (2013.01); *G06F 1/263* (2013.01); *G06F 13/4282* (2013.01)

(58) Field of Classification Search
CPC ............... G05D 23/19; G05D 23/1928; G06F 13/4282; G06F 1/263; G06F 1/187; G06F 1/181; G05B 15/02
See application file for complete search history.

(56) References Cited

U.S. PATENT DOCUMENTS

| | | |
|---|---|---|
| 7,480,115 B2 | 1/2009 | Hiroyuki et al. |
| 2013/0047640 A1 | 2/2013 | Nelson et al. |
| 2017/0284703 A1 | 10/2017 | Weksler et al. |

*Primary Examiner* — Tejal Gami
(74) *Attorney, Agent, or Firm* — Larson Newman, LLP

(57) ABSTRACT

An information handling system may include a chassis including a drive bay configured to receive a data storage device. A pre-heater installed at the drive bay may include a first power connector configured to mate with a corresponding power connector included at the drive bay, and configured when operating to increase a temperature of the information handling system to a predetermined level prior to initializing the information handling system for computational operation.

10 Claims, 7 Drawing Sheets

SYSTEM PRE-HEATER HAVING DATA STORAGE DRIVE FORM-FACTOR AND METHOD THEREFOR

FIELD OF THE DISCLOSURE

This disclosure generally relates to information handling systems, and more particularly relates a pre-heater having a data storage drive form-factor.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. The software resources include device drivers and firmware that control operation and interoperability of system components.

SUMMARY

An information handling system may include a chassis having a drive bay configured to receive a data storage device. A pre-heater installed at the drive bay may include a first power connector configured to mate with a corresponding power connector included at the drive bay, and configured when operating to increase a temperature of the information handling system to a predetermined level prior to initializing the information handling system for computational operation.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
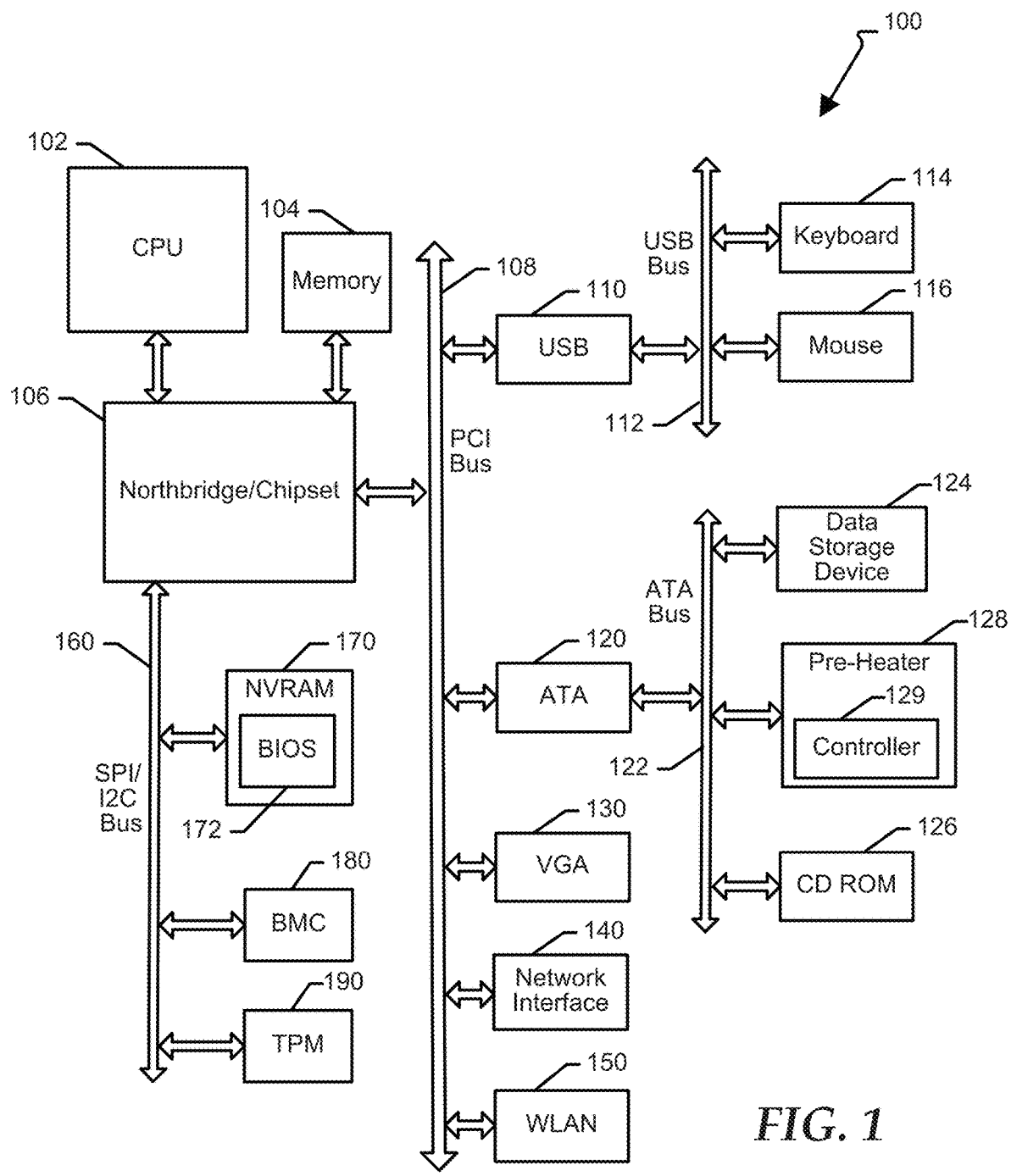
FIG. 1 is a block diagram of an information handling system including a pre-heater according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device 114, a mouse device controller 116, an eye-tracking device 118, an ATA bus controller 120, an ATA bus 122, a data storage device 124, a compact disk read only memory (CD ROM) device 126, a system pre-heater device 128 including a controller 129, a video graphics array (VGA) device 130, a network interface controller (NIC) 140, a wireless local area network (WLAN) controller 150, a serial peripheral interface (SPI) bus 160, a NVRAM 170 for storing BIOS 172, a baseboard management controller (BMC) 180, and a trusted platform module (TPM) 190. BMC 180 can be referred to as a service processor, an embedded controller (EC), and the like. BMC 180 includes a processor that can operate out-of-band with respect to CPU 102. For example, remote management systems can utilize BMC 180 to access components at information handling system independent of an operating state of CPU 102. BMC 180 may be responsible for performing low level hardware tasks including thermal management and power management operations. TPM 190 is compliant with an international standard for a secure cryptoprocessor, a dedicated microcontroller designed to secure hardware through integrated cryptographic keys. NVRAM 170 can be referred to as a SPI flash storage device, BIOS SPI, and the like.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, BIOS 172 can provide one or more runtime processes or device drivers that are configured to support functionality disclosed herein. After the initialization procedure is complete and an operating system, such as Windows, is loaded, computational operation of information handling system can begin.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

The specifications and operating requirements of an information handling system typically includes an operating temperature range. Operating the system outside of the specified temperature range can result in functional failures or damage to one or more system component. While excessively high-temperature environments are most typical, extreme low temperature environments may be encountered, such as at a remote or modular data center. If the temperature of an information handling system is below a specified minimum, the temperature of the system must be raised before the system can be initialized for operation.

Techniques disclosed herein can be used to pre-heat an information handling system before operating the system. In particular, pre-heater device 128 is a heating device having a form-factor similar to that of a standard data storage device, such as a 2.5 inch or a 3.5 inch hard drive. Pre-heater device 128 can include a power connector, and optionally a data connector, that conforms to the same data storage device mechanical and electrical standards that are supported by the information handling system, such as a Serial ATA (SATA) interface. For example, pre-heater device 128 can include a SATA power supply connector and a SATA data connector that can interface with corresponding connectors at a drive bay of the information handling system. In particular, information handling system 100 can include an enclosure and associated chassis components to facilitate installation of the components that make up system 100. The chassis typically includes one or more drive bays that provide a mechanical means for mounting data storage drives, such as magnetic spinning disk drive or solid state hard drives. The drive bay may include fixed electrical connectors that mate with corresponding connectors included on the data storage device when the device is inserted into the drive bay. Alternatively, system 100 can include flexible cabling including one or more connectors that mate with corresponding connectors at the data storage device. The layout of components within the chassis can vary based on the design considerations. For example, drive bays may be provided at the front, middle, or rear portions of an information handling system enclosure.

Figure 2:
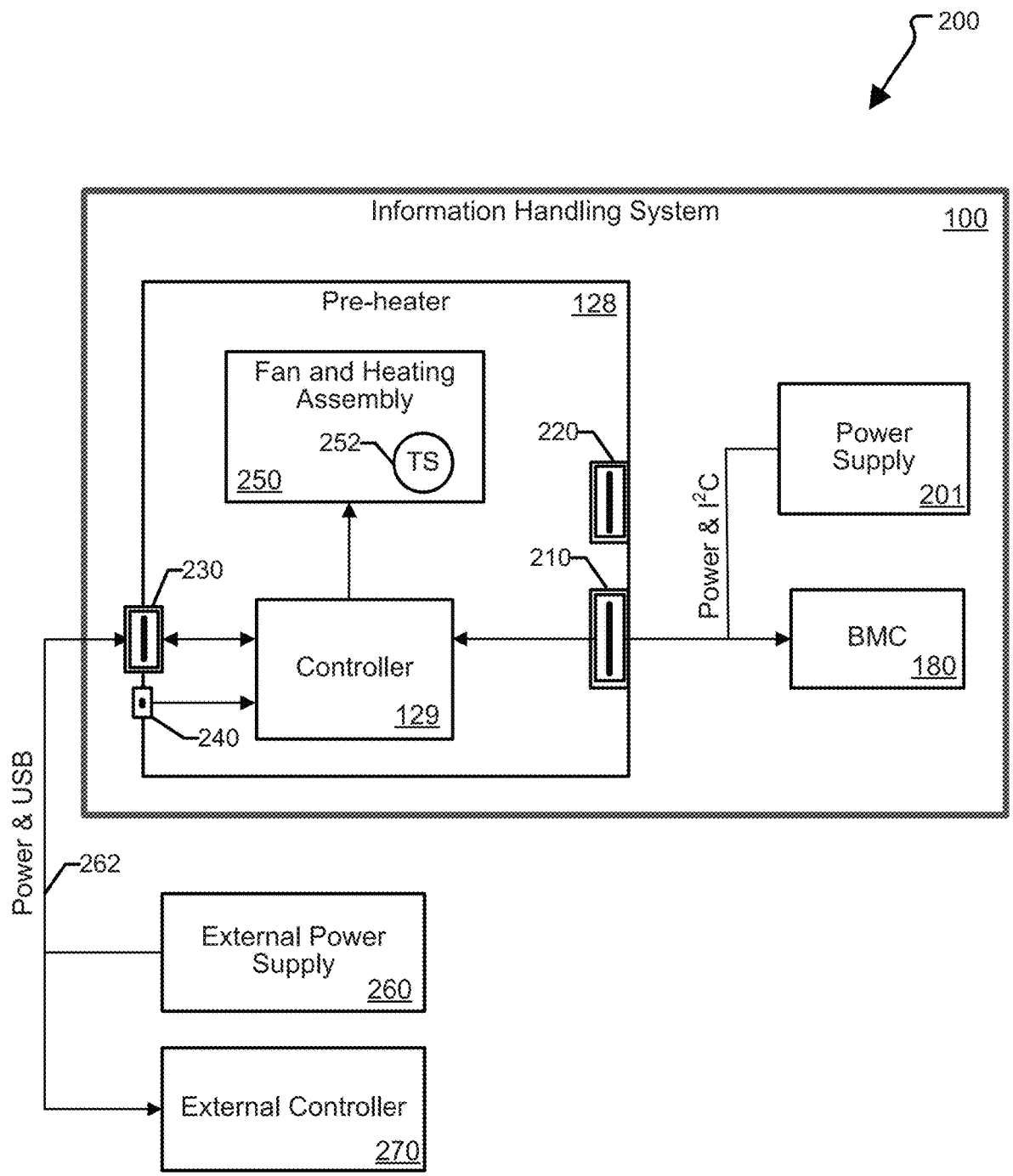
FIG. 2 is a block diagram illustrating a portion of the information handling system of FIG. 1 according to a specific embodiment of the present disclosure.

FIG. 2 shows a portion 200 of information handling system 100 including pre-heater apparatus or device 128 according to a specific embodiment of the present disclosure. Portion 200 shows pre-heater apparatus 128, power supply 201, and BMC 180. FIG. 2 also shows an external power supply 260 and an external controller 270 that are not included in the system enclosure. Pre-heater apparatus 128 is shown coupled to external power supply 260 and external controller 270 via an external interconnect 262. Pre-heater apparatus 128 includes controller 129, a power connector 210, a data connector 220, an external power connector 230, a mode switch 240, and a fan and heating element assembly 250 that includes a thermal sensor 252. Power connector 210 and data connector 220 (if present) are compliant with a data storage device standard supported at information handling system 100, such as the SATA standard.

FIG. 2 illustrates multiple embodiments for implementing the system pre-heater disclosed therein. For example, one or more of data connector 220, external power connector 230, mode switch 240, external power supply 260, and external controller 270 can be omitted without deviating from the scope of the present disclosure. Pre-heater apparatus 128 can include additional temperature sensors (not shown at FIG. 2) and the location of temperature sensor 252 and other temperature sensors included at device 128 can be selected based on design considerations. For example, one temperature sensor can be configured to monitor the temperature of heated air exiting pre-heater apparatus 128, another temperature sensor can be configured to monitor the temperature of air entering device 128, and still another temperature sensor can be configured to monitor the temperature outside of the enclosure of device 128. One of skill will appreciate that controller 129 can utilize electronic components designed to operate at temperatures below the specified minimum operating temperature of one or more components included at information handling system 100.

Pre-heater apparatus or device 128 can be configured to operate in one or more configurations and utilize one or more operating methods, described in detail below. In one particular embodiment, BMC 180 is operational and can send a message to controller 129 identifying a request to initialize information handling system 100 for computational operation. For example, a user may actuate a power button provided at the enclosure. Because BMC 180 is operational, the apparatus may, but may not, have access to temperature information at system 100. In response to the message, controller 129 can utilize temperature sensor 252 to determine a current temperature at information handling system 100. If the current temperature is below a particular threshold, such as a minimum specified operating temperature of system 100, controller 129 can activate fan and heating element assembly 250. Pre-heater apparatus 128 is configured to exhaust heated air within the system enclosure, and preferably, recirculate the air within the enclosure through fan and heating element assembly 250.

Controller 129 can monitor the temperature at information handling system using temperature sensor 252 or another temperature sensor included at pre-heater apparatus 128. For example, pre-heater apparatus 128 can include a temperature sensor (not shown at FIG. 2) that is configured to monitor a temperature outside the enclosure of pre-heater apparatus 128. Once controller 129 determines that the temperature at information handling system 100 has increased to a value that is within the operating specifications of system 100, controller 129 can deactivate fan and heating element assembly 250, and optionally send a message to BMC 180 signaling that system 100 can be initialized for computational operation. The initialization may include providing power to selected components of system 100, executing firmware such as BIOS 172, loading an operating system, and the like. Power to operate pre-heater apparatus 128 can be provided by either power supply 201 or external power supply 260.

In another embodiment, BMC 180 is not presently operational, and controller 129 can automatically monitor an ambient temperature within the enclosure of information handling system 100. If the current temperature is below a particular threshold, such as a minimum specified operating temperature of system 100, controller 129 can activate fan and heating element assembly 250. Once controller 129 determines that the temperature at information handling system 100 has increased to a value that is within the operating specifications of system 100, controller 129 can deactivate fan and heating element assembly 250. If the ambient temperature again falls to a predetermined value, for example approaching the minimum temperature for system 100, fan and heating element assembly 250 can be reactivated, and so on. Accordingly, pre-heater can maintain the temperature within the enclosure of information handling system within a predetermined range as long as power is provided to pre-heater apparatus 128. Power to operate pre-heater apparatus 128 can be provided by either power supply 201 or external power supply 260.

In still another embodiment, pre-heater apparatus 128 can receive a request to operate from external controller 270. For example, external power connector 230 can be compliant with one or more USB interface standards, wherein external interconnect 262 can support transfer of both power and data. The request may be to initiate operation and/or terminate operation of pre-heater apparatus 128, wherein controller 129 is configured to operate in a predetermined mode, or the request may be a command to activate and/or deactivate fan and heating element assembly 250. Power to operate pre-heater apparatus 128 can be provided by either power supply 201 or external power supply 260. External controller 270 can be coupled to other systems (not shown at FIG. 2 via wireless or wired interconnects. For example, external controller can receive a request from a remote system administrator to activate information handling system 100, following pre-heating if necessary. Similarly, external controller 270 can forward a message from controller 129 to a remote administrator identifying operating characteristics of information handling system 100, such as the temperature at of system 100, availability or charge level of external power supply 260, successful or unsuccessful pre-heating of system 100, and the like.

In any embodiment, mode switch 240 can be an electromechanical switch operated by a user or administrator of information handling system 100 to select a desired operating mode of pre-heater apparatus 128. Alternatively, controller 129 can be configured to automatically, or in response to a command, implement a particular operating mode or transition from one operating mode to another. Data connector 220, if implemented, can be used to provide communication between pre-heater apparatus 128 and processes executing at information handling system 100 after BIOS initialization has begun at system 100. External controller 270 can be utilized as described above in any operating mode to complement or override a current operation of pre-heater apparatus 128, or to communicate system information to remote administration personnel, remote administration systems, and the like.

FIGS. 3-7 show pre-heater apparatus 128 according to multiple embodiments of the present disclosure. The features of pre-heater apparatus 128 illustrated at FIGS. 3-7 are merely exemplary, and variations of pre-heater apparatus 128 having fewer or a greater number of features and differing physical layout can be implemented without deviating from the scope of the embodiments of the present disclosure.

Figure 3:
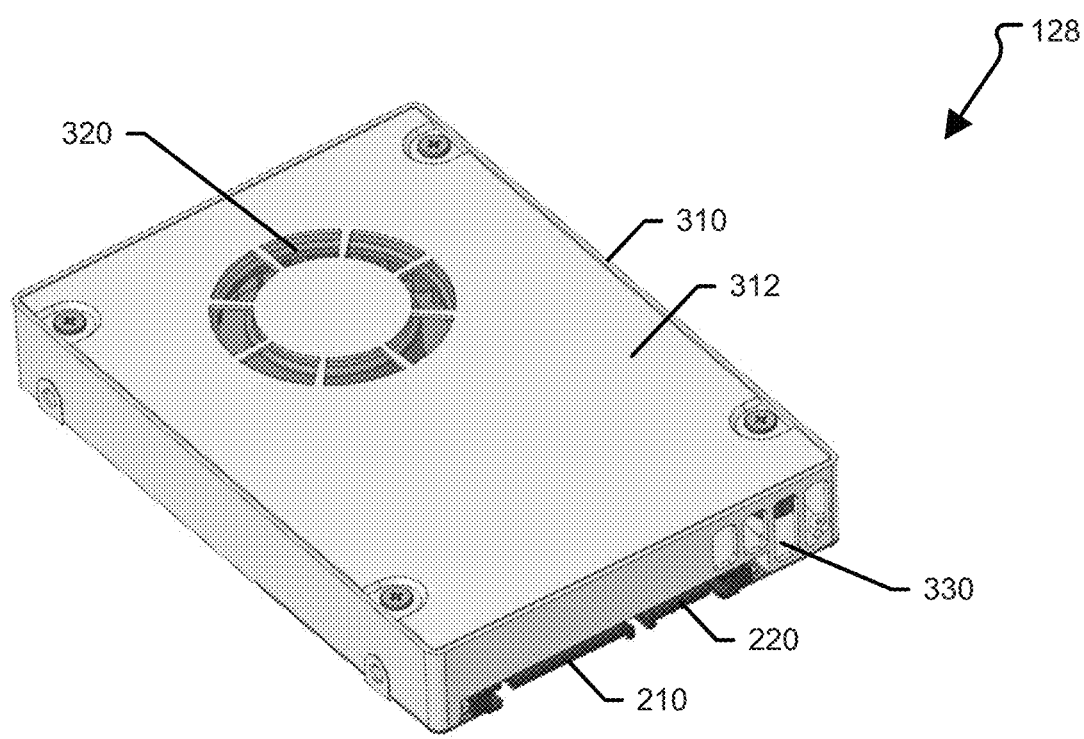
FIGS. 3-7 illustrate a pre-heater according to multiple embodiments of the present disclosure.

FIG. 3 provides a perspective view of pre-heater apparatus 128 showing an enclosure 310 with an enclosure cover 312, power connector 210, data connector 220, an air inlet 320, and a warm air exhaust port 330. As described above, power connector 210, data connector 220, and in general enclosure 310 are substantially compliant with a standard storage device physical specification, such as a 2.5 inch or a 3.5 inch SATA, Solid State Drives (SSD), Small Computer System Interface (SCSI), and the like. Accordingly, connectors 210 and 220 of pre-heater apparatus 128 are configured to mate with corresponding standard storage device connectors provided at a drive bay of information handling system 100 in the same way that a data storage device of that specification can occupy that particular drive bay.

Figure 4:
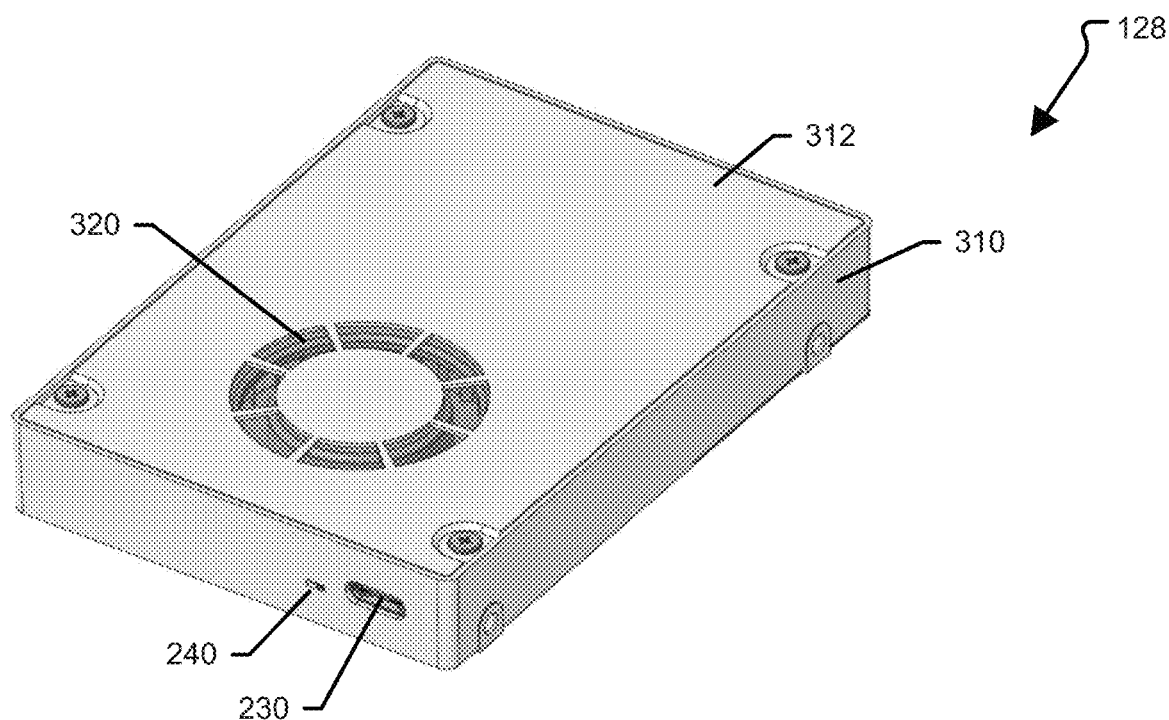

FIG. 4 provides a perspective view of pre-heater apparatus 128 showing enclosure 310 with enclosure cover 312, air inlet 320, external power connector 230, and mode switch 240. In the present example, external power connector 230, and mode switch 240 are located on an end of the pre-heater apparatus 128 that is opposite the end having power connector 210 and data connectors 220, however the location can vary. In an embodiment, external power connector 230 can be a USB connector, such as a type-C connector, and may support data communication. For example, external controller 270 can communicate with controller 129 using external power connector 230.

Figure 5:
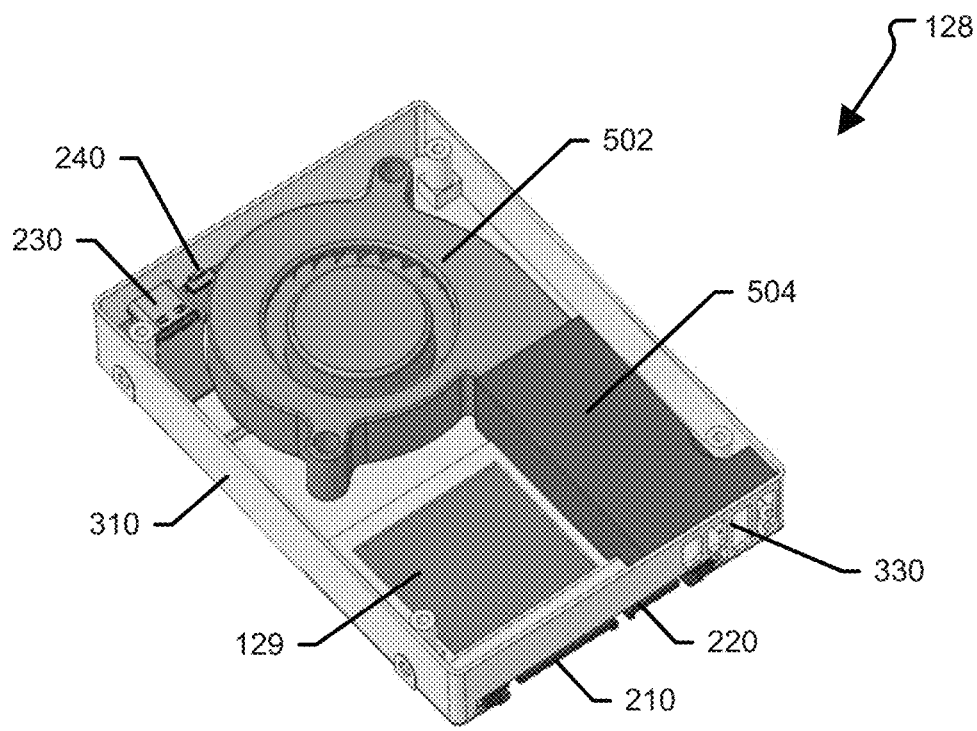

FIG. 5 provides a perspective view of pre-heater apparatus 128 showing enclosure 310 with enclosure cover 312 removed to show a fan 502, air shroud 504, and controller 129. FIG. 5 also shows power connector 210, data connector 220, warm air exhaust port 330, external power connector 230, and mode switch 240. During operation, fan 502 is configured to draw in air at inlet 320 of enclosure cover 312 (not shown at FIG. 5), heat the air at a heating element included at shroud 504 (not shown at FIG. 5), and expel the heated air at exhaust port 330 into the interior of the enclosure housing information handling system 100.

Figure 6:
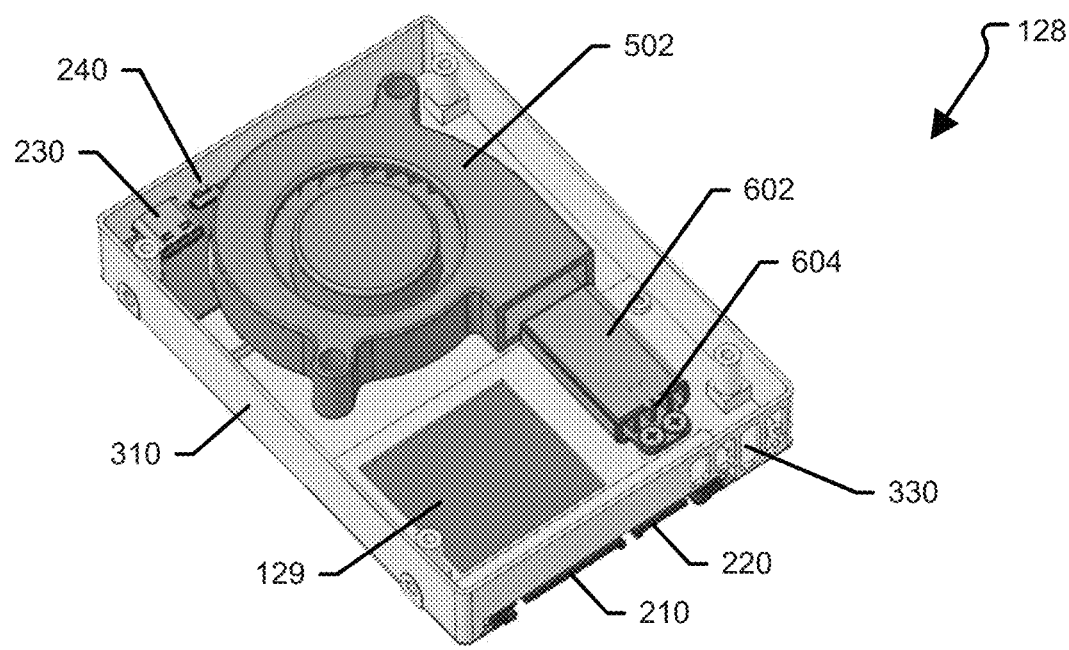

FIG. 6 is similar to FIG. 5, except that shroud 504 has been removed to show heating element assembly 250, which includes heating element 602 and heat sink 604. FIG. 6 also shows enclosure 310, fan 502, controller 129, power connector 210, data connector 220, warm air exhaust port 330, external power connector 230, and mode switch 240. In an embodiment, heat sink 604 can include an extruded conduit having a first opening to interface with fan 502 and a second opening to expel heated air at exhaust port 330. Heating element 602 can include a thin film heater and can be wrapped around the external surface of heat sink 604. In an embodiment, heating element 602 can be configured to sink fifteen watts of electric power, though a greater or lesser power dissipation value can be provided based on design and environmental considerations. One of skill will appreciate that another type of heating element can be used. During operation of pre-heater apparatus 128, heat generated at heating element 602 is conductively transferred to heat sink 604. Heat sink 604 is configured to act as a heat exchanger, warming air received from fan 502 as the air passes through heat sink 604. Heat sink 604 can include internal fins or air channels, and corresponding openings, to provide additional surface area and correspondingly greater heat transfer from heating element 602 to the air passing through heating element assembly 250.

Figure 7:
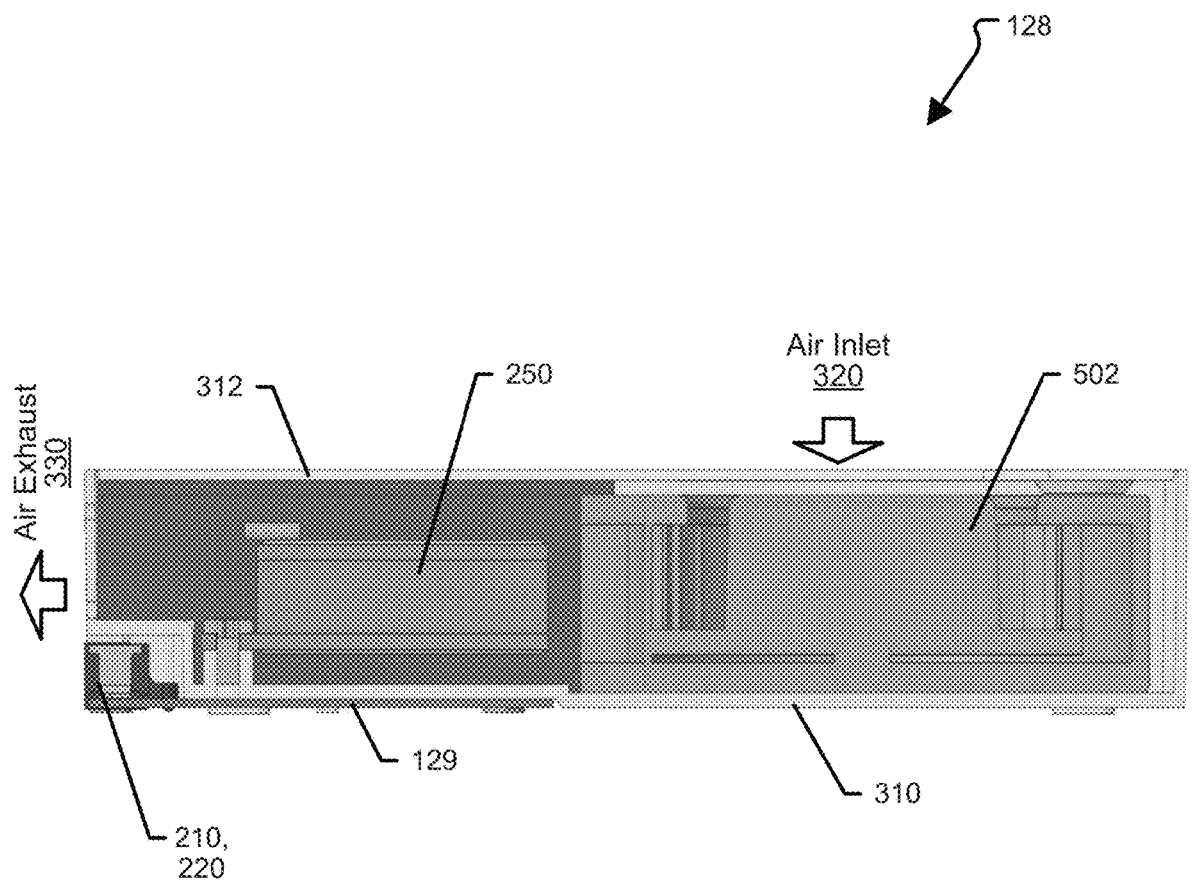

FIG. 7 shows a cut-away side view of pre-heater apparatus 128 including enclosure 310, enclosure cover 312, fan 502 and air inlet 320, heating element assembly 250, warm air exhaust port 330, controller 129, and power and data connectors 210 and 220. Additional elements described above are not shown for clarity. In an embodiment heating element assembly 250 can be thermally isolated from enclosure 310 so that heat generated at heating element 602 and transferred to heat sink 604 is opportunistically transferred to air flowing through heat sink 604 rather than being transferred to enclosure 310.

Figure 8:
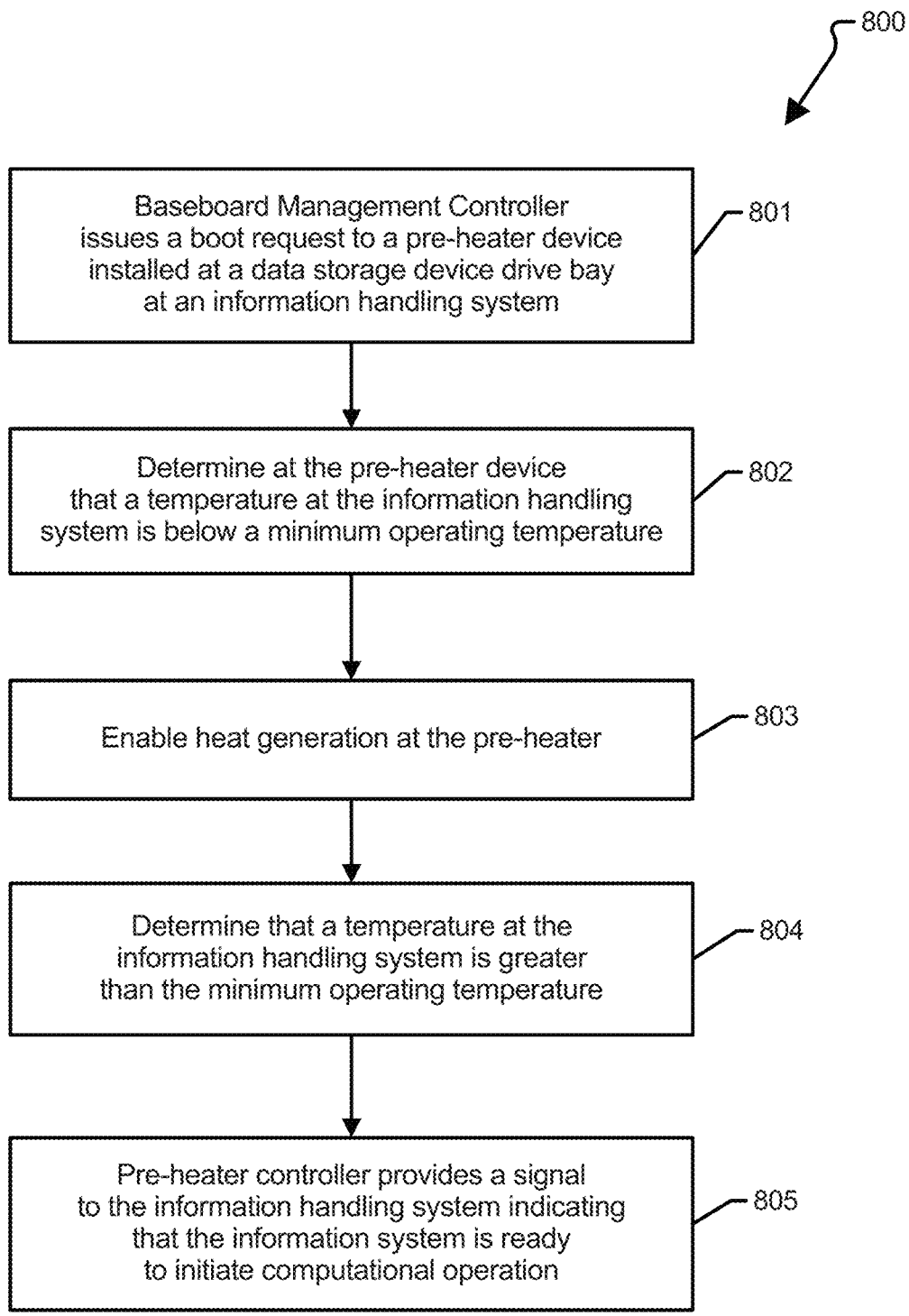
FIG. 8 is a flow diagram illustrating a method for operating a pre-heater at an information handling system according to a specific embodiment of the present disclosure.

FIG. 8 shows a method 800 for pre-heating an information handling system according to a specific embodiment of the present disclosure. Method 800 begins at block 801 where a baseboard management controller issues a boot request to a pre-heater apparatus installed at a data storage device drive bay at an information handling system. For example, in response to a user actuating a power button provided at the enclosure of information handling system 100, BMC 180 can send a message to controller 129 via the I²C interface provided at data connector 210, the message indicating that the pre-heater apparatus 128 is to begin heating air inside the enclosure of system 100. At block 802, the pre-heater apparatus determines that a temperature at the information handling system is less than a minimum operating temperature. For example, controller 129 can utilize temperature sensor 252 to determine that the temperature of system 100 is below a first predetermined value stored at controller 129 or provided by BMC 180. At block 803, heat generation is enabled at the pre-heater. For example, in response to determining that that temperature at information handling system 100 is below a specified minimum operating temperature, controller 129 can activate heating element 602 at heating element assembly 250, causing warmed air to exit from exhaust port 330.

Method 800 continues at block 804 where a temperature at the information handling system is determined to be greater than the minimum operating temperature. For example controller 129 can utilize temperature sensor 252 to determine that the temperature of system 100 has increased to a value greater than a second predetermined value. At this time, controller 129 may deactivate heating element assembly 250, or deactivation may be in response to a message from BMC 180. Method 800 completes at block 805 where the pre-heater controller provides a signal to the information handling system indicating that the information system is ready to initiate computational operation. For example, controller 129 can utilize the I²C interface at data connector 210 to send a message to BMC 180 indicating that a boot sequence can commence at system 100. In an embodiment, the second predetermined temperature value can be the same or substantially similar to the first predetermined temperature value. Alternatively, the second predetermined value can be selectively configured to provide hysteresis between the activation temperature and the deactivation temperature. In another embodiment, the same predetermined temperature value can be used at block 802 and block 804.

Figure 9:
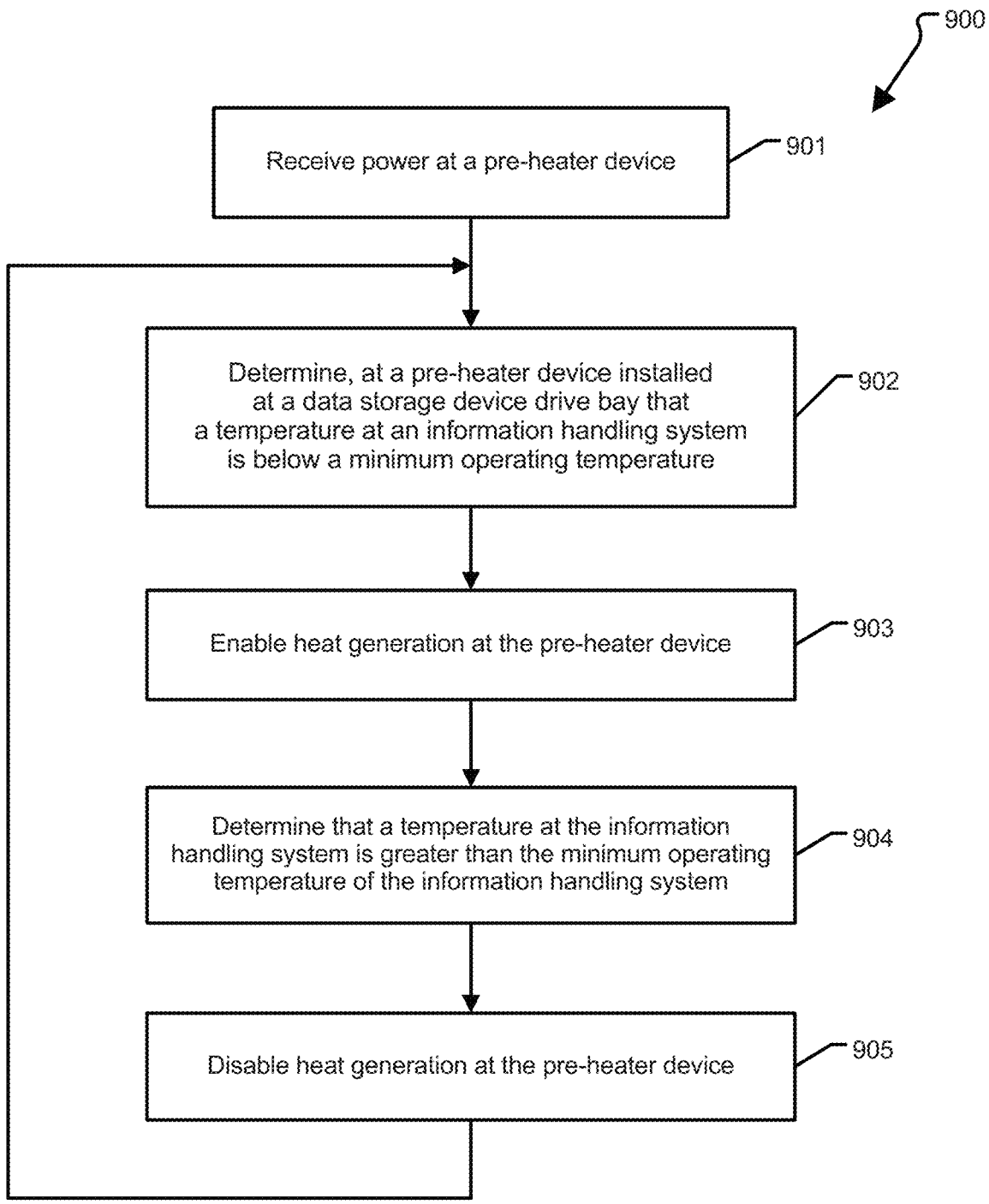
FIG. 9 is a flow diagram illustrating a method for operating a pre-heater at an information handling system according to another embodiment of the present disclosure.

FIG. 9 shows a method 900 for pre-heating an information handling system according to another embodiment of the present disclosure. Method 900 begins at block 901 where power is received at a pre-heater apparatus installed at an information handling system. For example, pre-heater apparatus 128 can receive power from power supply 201 included at information handling system 100 or from external power supply 260. In an embodiment, external power supply 260 can include a battery. At block 902, a pre-heater apparatus installed at a data storage device drive bay of the information handling system can determine that a temperature at the system is less than a minimum operating temperature. For example, controller 129 can utilize temperature sensor 252 to determine that the temperature of system 100 is below a first predetermined value stored at controller 129. At block 903, heat generation is enabled at the pre-heater apparatus, for example fan and heating assembly 250 can be activated by controller 129. At block 904, controller 129 can determine that a temperature at information handling system 100 is greater than the minimum operating temperature of system 100. At block 905, controller 129 can disable heat generation a pre-heater apparatus 128 in response to determining that the current temperature at system 100 is high enough to initiate a boot sequence at system 100, if desired. Method 900 returns to block 902 where controller 129 can continue to monitor the temperature at information handling system 100 so as to maintain system 100 at a suitable temperature for operation.

One of skill will appreciate that the temperature at which heating is re-enabled at pre-heater apparatus 128 can be greater that the temperature that heating is initially enabled, thereby providing hysteresis so as to prevent the temperature at information handling system 100 from falling below the specified minimum operating temperature of system 100 as long as power is provided to pre-heater apparatus 128. In an embodiment, method 900 can be performed prior to a request to initialize information handling system 100 by external controller 270 or BMC 180.

Referring back to FIG. 1, information handling system 100 can include additional components and additional buses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

Information handling system 100 can include a set of instructions that can be executed to cause the information handling system to perform any one or more of the methods or computer based functions disclosed herein. Information handling system 100 may operate as a standalone device or may be connected to other computer systems or peripheral devices, such as by a network.

In a networked deployment, information handling system 100 may operate in the capacity of a server or as a client user computer in a server-client user network environment, or as a peer computer system in a peer-to-peer (or distributed) network environment. Information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An apparatus to pre-heat an information handling system, the apparatus comprising:
   an enclosure;
   a first power connector configured to mate when installed at a data storage device drive bay of the information handling system with a corresponding power connector included at the data storage device drive bay;
   a heating element;
   a fan to circulate air heated by the heating element to an opening in the enclosure, the opening configured to provide heated air within an enclosure of the information handling system when the pre-heater apparatus is generating heat;
   a thermal sensor; and
   a control circuit to enable and/or disable operation of the fan and/or heating element based at least in part based on temperature information provided by the thermal sensor.

2. The apparatus of claim 1, wherein the control circuit is further to:
in response to determining that a temperature indicated by the thermal sensor is greater than a second predetermined value, provide an indication to a baseboard management controller (BMC) at the information handling system that the information handling system is ready to initiate computational operation.

3. The apparatus of claim 2, wherein the first power connector provides a data communication interface to the BMC.

4. The apparatus of claim 1, further comprising:
a second power connector to receive power from a source external to the information handling system.

5. The apparatus of claim 4, wherein the second power connector is a universal serial bus compliant connector to provide a communication interface with a controller external to the information handling system.

6. The apparatus of claim 1, further comprising a first data connector configured to mate when installed at the data storage device drive bay with a corresponding data connector included the data storage device drive bay.

7. The apparatus of claim 1, further comprising a first mode of operation wherein the control circuit is to enable heat generation at the pre-heater apparatus if a temperature indicated by the thermal sensor is below a first predetermined value, and is to disable heat generation at the pre-heater apparatus if the temperature indicated by the thermal sensor is greater than a second predetermined value.

8. The apparatus of claim 1, further comprising a first mode of operation wherein the control circuit is to enable heat generation at the pre-heater apparatus, and in response to determining at the control circuit that the temperature indicated by the thermal sensor has not increased to a predetermined value within a predetermined amount of time, disable heat generation at the pre-heater apparatus.

9. The apparatus of claim 1, further comprising a first mode of operation wherein the control circuit is to enable heat generation at the pre-heater apparatus in response to a request received from a baseboard management controller included at the information handling system.

10. The apparatus of claim 1, further comprising a switch to select an operating mode of the pre-heater apparatus.

\* \* \* \* \*